United States Patent
Heflin et al.

(12)
(10) Patent No.: US 6,302,359 B1
(45) Date of Patent: Oct. 16, 2001

(54) FREE FALL PAYLOAD DISTRIBUTION DEVICE AND METHOD

(75) Inventors: Mark Heflin, Manchester; Todd Grenga, Enfield, both of CT (US)

(73) Assignee: Capewell Components Company Limited Partnership, South Windsor, CT (US)

( * ) Notice: Subject to any disclaimer, the term of this patent is extended or adjusted under 35 U.S.C. 154(b) by 0 days.

(21) Appl. No.: 09/548,953

(22) Filed: Apr. 13, 2000

(51) Int. Cl.$^7$ .................................................. B64D 17/54
(52) U.S. Cl. ................. 244/149; 244/137.3; 244/151 B; 244/147
(58) Field of Search ..................... 244/149, 150, 244/137.3, 138 R, 151 B, 147; 220/315, 316, 323; 102/387, 338, 340, 393

(56) References Cited

U.S. PATENT DOCUMENTS

| | | | |
|---|---|---|---|
| 2,317,256 | * | 4/1943 | De Kurowski .................... 102/387 |
| 2,353,440 | | 7/1944 | Bresee . |
| 2,687,263 | * | 8/1954 | Frieder et al. .................... 244/149 |
| 2,778,587 | | 1/1957 | Moran . |
| 2,875,918 | * | 3/1959 | Baumier . |
| 3,038,407 | * | 6/1962 | Robertson et al. ............... 102/340 |
| 3,396,924 | | 8/1968 | Kriesel . |
| 3,419,235 | | 12/1968 | Wood, Jr. . |
| 3,584,581 | * | 6/1971 | Joppa et al. ..................... 102/387 |
| 3,593,664 | | 7/1971 | Davis et al. . |
| 3,964,700 | | 6/1976 | Adams et al. . |
| 4,387,740 | * | 6/1983 | Vanzant . |
| 4,498,393 | * | 2/1985 | Fischer et al. ................... 102/387 |
| 4,565,341 | * | 1/1986 | Zacharin . |
| 4,592,524 | | 6/1986 | Nöhren . |
| 4,639,229 | * | 1/1987 | Wright et al. . |
| 4,783,027 | | 11/1988 | Jones . |
| 5,239,927 | * | 8/1993 | Frye et al. ....................... 102/340 |
| 5,760,330 | * | 6/1998 | Himmert et al. ................ 102/387 |

FOREIGN PATENT DOCUMENTS

1185813 * 11/1957 (FR) ..................................... 244/138

* cited by examiner

*Primary Examiner*—Charles T. Jordan
*Assistant Examiner*—Tien Dinh
(74) *Attorney, Agent, or Firm*—Alix, Yale & Ristas, LLP (57) ABSTRACT

A device and method of use for opening a container during descent so that objects within the container may be dispersed over a controlled ground area. The device includes a housing with a parachute canopy contained within. A sling is attached to the canopy within the housing and extends external to the housing. A cap is selectively engageable with the housing to close the housing. A spring within the housing exerts outward force on the cap. An actuation device is mounted to the cap to selectively disengage the cap from the housing. When the cap is disengaged from the housing the cap is ejected by the force of the spring. A lanyard connecting the cap to the canopy draws the canopy out of the housing for deployment. Deployment of the canopy transfers tension force through the slings to the container. The tension force imposed on the container by the slings opens the container, releasing objects held therein. The objects are released at a predetermined height. The dispersion of the objects over the ground is limited by their separation at the predetermined height.

20 Claims, 5 Drawing Sheets

FREE FALL PAYLOAD DISTRIBUTION DEVICE AND METHOD

BACKGROUND OF THE INVENTION

The present invention relates generally to the air delivery of material. It is more particularly concerned with a new and improved apparatus and method for the air delivery of material for dispersion over a large but controlled ground area.

The dropping of supplies from an aircraft in flight to the ground below is well known. Generally, the supplies are either dropped individually and allowed to free fall to the ground or packed in a a container for controlled delivery of the container to the ground via a parachute. Both of these methods present problems. Materials and supplies which are air dropped individually will be spread over a large and almost impossible to control ground area. Thus, there is little likelihood that the majority of supplies or materials will arrive where needed. Materials and supplies packed in containers and dropped for controlled descent by a parachute have a somewhat better chance of being placed in a desired location. However, in a military situation, the centralized location of the materials within the container puts personnel at risk when they attempt to retrieve those materials. Further, in hilly or mountainous terrain the packaging of all of the materials within a single container may make placement of the container at any desired location an all or nothing situation. Naturally, for materials delivered by either method, the greater the altitude of the aircraft dropping the materials, the less certain will be the final ground location of the materials. This is of special concern in military operations where aircraft must fly at high altitudes to avoid enemy ground fire.

SUMMARY OF THE INVENTION

The invention in a preferred form is a free fall distribution device for incorporation into a container or similar device which holds a plurality of individual materials. The free fall distribution device comprises a tubular housing having spaced first and second end portions with respective first and second ends. A radially inwardly projecting circumferential channel or shoulder is formed in the housing adjacent the first end portion. A plurality of slots longitudinally extend from the first end toward the second end of the housing.

A flange is mounted to the first end portion substantially perpendicular to the length of the housing. Preferably, the flange is permanently fixed to the housing. The flange includes a plurality of radially (with respect to the housing) extending slots, which are interrelated with respective slots on the housing. Each interrelated housing and respective flange slot forms a single passage. A base plate is mounted to the second end portion.

A plurality of flexible or semi-flexible slings have a first end disposed within the housing toward the second end portion and an opposing second end extending radially from the housing. A parachute canopy is attached by shroud lines to the sling first ends. The parachute canopy is foldable to fit within the housing.

A cap is engageable substantially within the housing first end portion. When engaged, an actuation end of the cap faces outwardly of the housing first end portion and a locking end is located within the housing between the shoulder and housing second end. The cap locking end includes a plurality of pawls movable between radially extended and retracted positions. An actuation device is mounted to the cap and is accessible for manual manipulation from the actuation end. The actuation device cooperates with the pawls to selectively maintain the pawls in either the radially projected or radially retracted positions. A backing plate defining an aperture is positionable over the folded parachute canopy within the housing and a spring is compressible within the housing between the engaged actuation device and backing plate. A lanyard attaches the actuation device to the spring, backing plate and parachute canopy.

When assembled, the sling first ends are positioned adjacent the housing second end and the slings extend along the housing inner wall into the housing slots and flange slots, with the sling second ends extending radially therefrom. The parachute canopy is folded so that it is nested within the housing, above the base plate and between the slings. The free end of the parachute canopy is located toward the housing first end. The backing plate is located over the canopy free end. The cap is engaged with the housing so that the locking end is within the housing first end portion. A shoulder on the cap prevents the actuation end from movement into the housing. When the cap is engaged within the housing the pawls at the locking end project radially outwardly to engage the housing shoulder. Engagement of the pawls with the housing shoulder prevents movement of the locking end out of the housing. The cap shoulder and pawls combine to selectively fix the cap to the housing. The spring is compressed between the cap locking end and the backing plate. The lanyard is attached to the cap locking end, preferably extends through the interior of the spring and backing plate aperture and is attached at its opposing end to the parachute canopy.

The assembled free fall distribution device is incorporated within a container holding a material such as, for instance, a plurality of meal packets. For a cardboard container, a circular hole may be cut in the container and the free fall distribution device second end inserted therein. The flange functions to prevent the free fall distribution device from falling within the container. The radially extending slings are attached to lines. The lines may be laced throughout the container or may be connected to container attachment devices.

After assembly of the free fall distribution device and incorporation into a container, the actuation device is set. If the actuation device is a timer, it may be set for a predetermined time delay after actuation. The assembly is loaded into an aircraft and flown to a desired location. The container is ejected from the aircraft in-flight which activates the actuation device and initiates timer countdown. As the timer counts down, the container is in free fall toward the ground. At the predetermined time, which is related to a desired height, the timer times out; the pawls move to the radially retracted position and out of engagement with the housing shoulder; and the cap is ejected from the housing by the force of the compressed spring. Due to the free length of the spring, most of the spring also exits the housing. The momentum of the cap and spring and the force of the slip stream on the cap and spring exerts a tension force on the parachute canopy via the lanyard, which draws the canopy from the housing. As the canopy enters the slip stream, it will deploy.

Deployment of the parachute canopy functions to impose sudden tension force through the shrouds and slings to the cords attached to the slings. If the cords are laced to the container, the force imposed will be sufficient to destroy the container. If the cords are attached to container holding devices, the force imposed will be sufficient to open the container. In either situation, the individual materials enclosed within the opened container are freed at a predetermined height and free fall to the ground. Control of the canopy deployment height and thereby control of individual material separation, by way of actuation device setting, allows control of the ground dispersion of the individual materials.

An object of the invention is to provide a new and improved method and apparatus for controlled ground dispersion of materials dropped from an aircraft.

Another object of the invention is to provide a method and apparatus for controlled ground dispersion of materials dropped from an aircraft which is more controllable in adverse terrain than conventional methods.

BRIEF DESCRIPTION OF THE DRAWINGS

Other objects and advantages of the invention will be evident to one of ordinary skill in the art from the following detailed description made with reference to the accompanying drawings, in which.

DESCRIPTION OF THE PREFERRED EMBODIMENT

Figure 3:
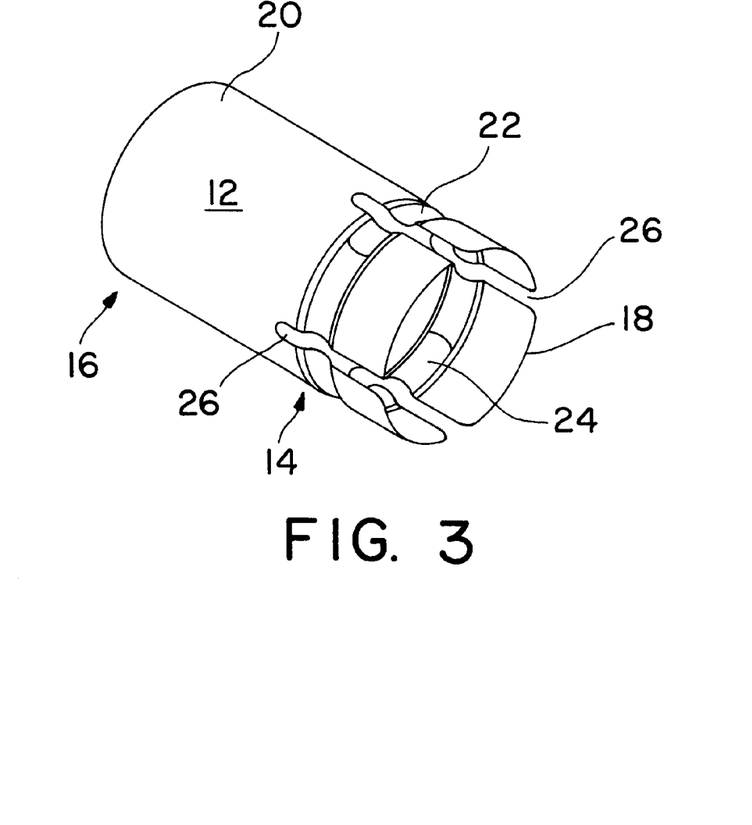
FIG. 3 is a perspective view of a housing portion of the free fall distribution device of FIG. 2.
Figure 4:
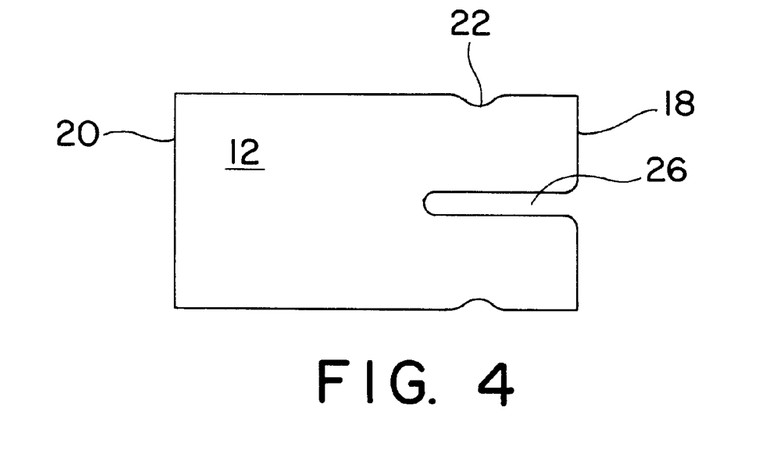
FIG. 4 is a side view of the housing portion of FIG. 2.

With reference to the drawings, wherein like numerals represent like parts, a free fall distribution device is generally designated by the numeral 10. As shown in FIGS. 3 and 4, the free fall distribution device comprises generally a tubular housing 12 with first 14 and second 16 end portions having respective first and second ends 18, 20. A plurality of slots 26 are defined within the housing 12. Each slot 26 extends longitudinally from the first end 18 toward the opposing second end 20 of the housing. A circumferential channel 22, segmented by the slots 26, is formed in the material of the housing adjacent the first end 18. The channel 22 extends radially inwardly of the general inside diameter of the housing to create a segmented shoulder 24 within the inside of the housing 12 adjacent the first end portion 14. While the housing 12 may be manufactured from a variety of materials, it is preferably manufactured from steel.

Figure 1:
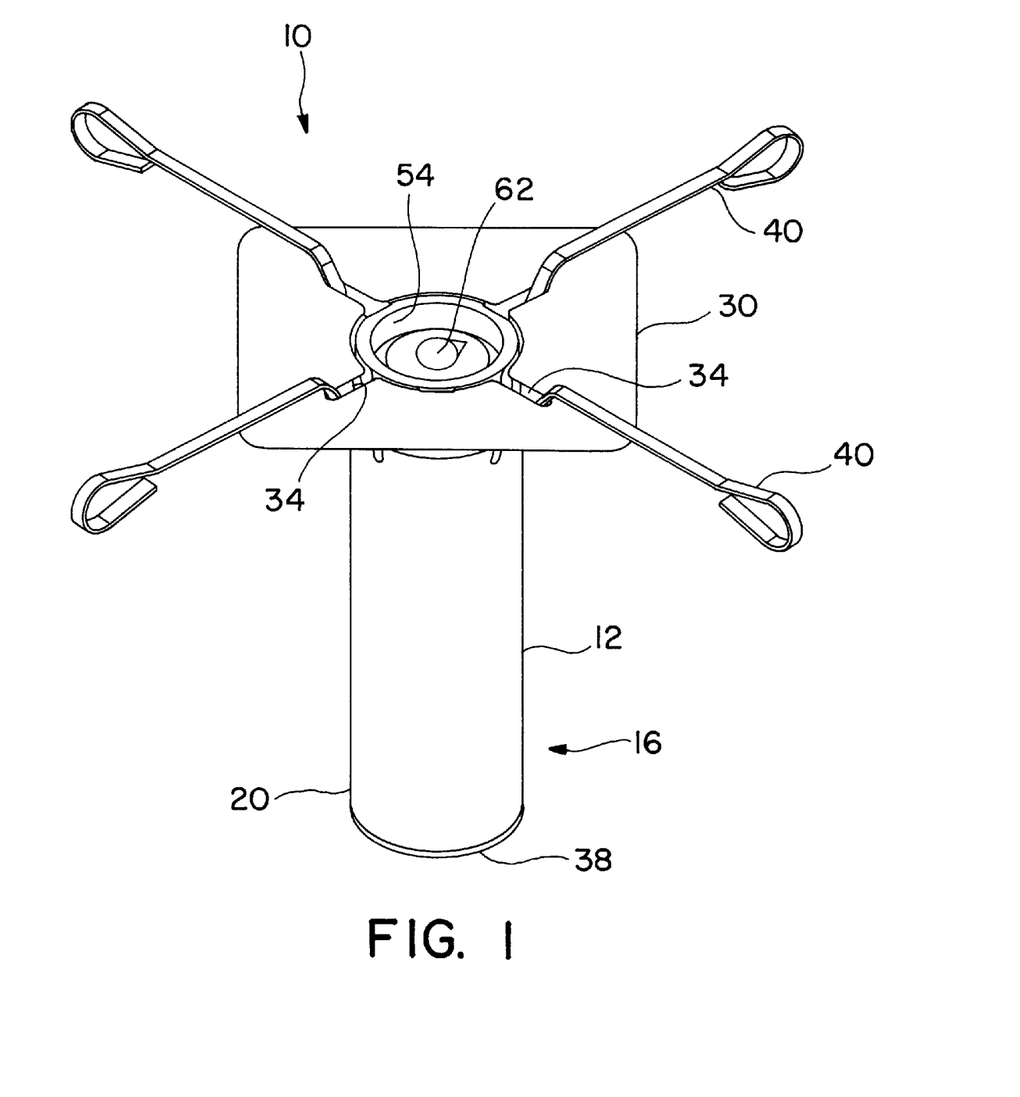
FIG. 1 is a perspective view of an embodiment of the assembled free fall distribution device.
Figure 2:
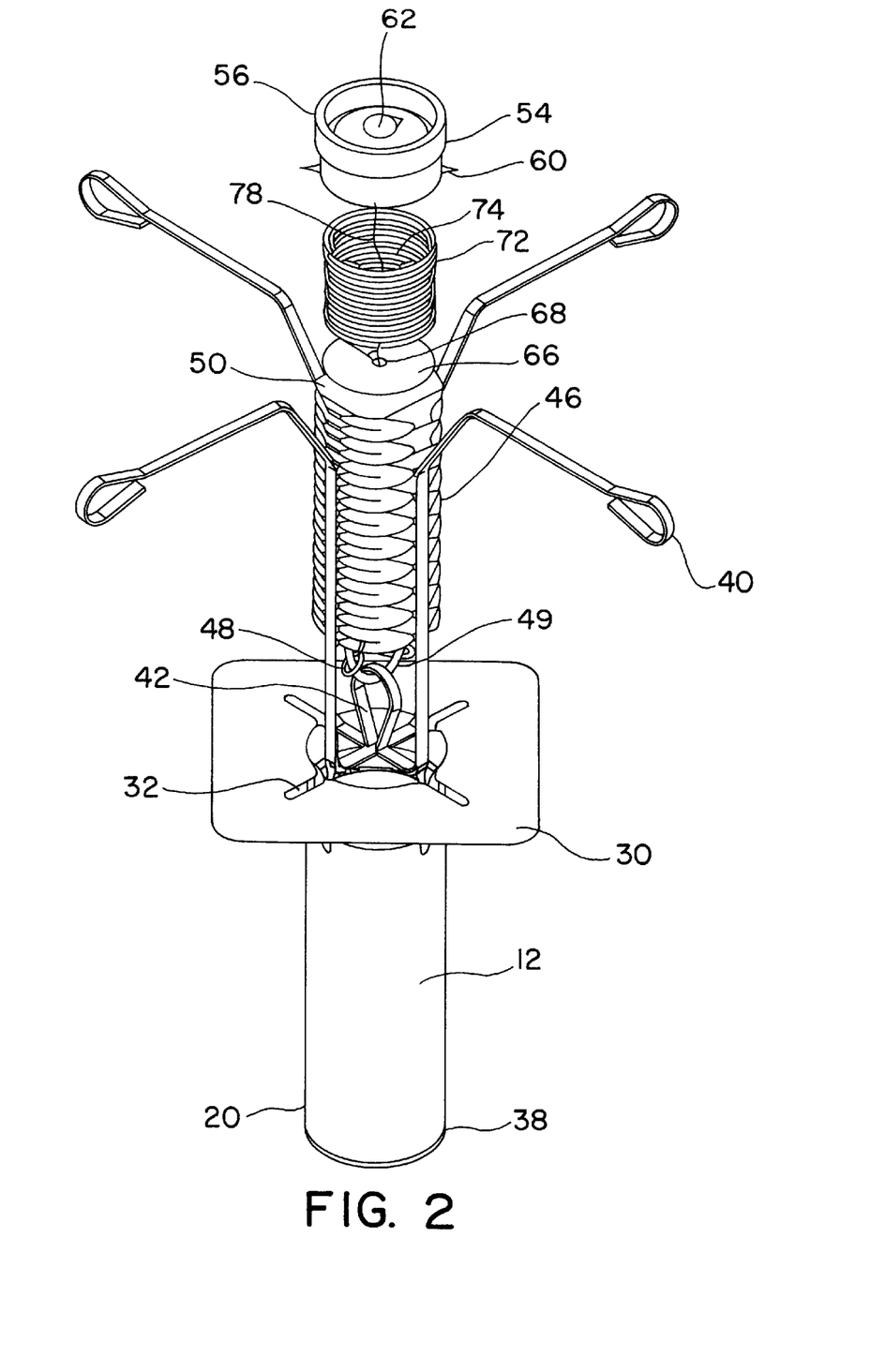
FIG. 2 is an exploded perspective view of the free fall distribution device of FIG. 1.

As shown in FIGS. 1 and 2, a flange 30 is mounted adjacent the first end 18 and extends substantially perpendicularly to the longitudinal axis of the housing 12. Preferably, the flange 30 is permanently mounted to the housing 12. While the flange 30 is shown as having a square shape, it should be realized that flanges of other shapes and sizes will serve a similar purpose as later described and are fully encompassed by the invention. The flange 30 includes a plurality of slots extending from the housing 12 radially outwardly. The flange 30 is mounted so that the flange slots 32 and housing slots 26 are radially aligned and interrelated so that each housing slot and respective flange slot form a single uninterrupted sling passage 34. A base plate 38 is mounted to the second end portion 16.

A plurality of slings 40 are disposed within the housing 12. The slings 40 are flexible and preferable a webbed textile material such as nylon. Preferably, as shown in FIG. 2, the plurality of slings form a loop or eye 42. When disposed within the housing 12 each sling 40 will longitudinally extend from the base plate 38 along the interior wall of the housing 12 into a sling passage 34 and radially extend therefrom.

A parachute canopy 46 is attached to canopy shrouds 48. The shrouds 48 are connected to the sling eye 42 by, a clevis 49. The parachute canopy 46 is foldable so that it will fit within the housing 12, above the base plate 38 and between the plurality of slings 40, when the slings 40 are located within the housing 12. The free end 50 of the folded parachute 46 will be adjacent or within the housing first end portion 14.

Figure 6:
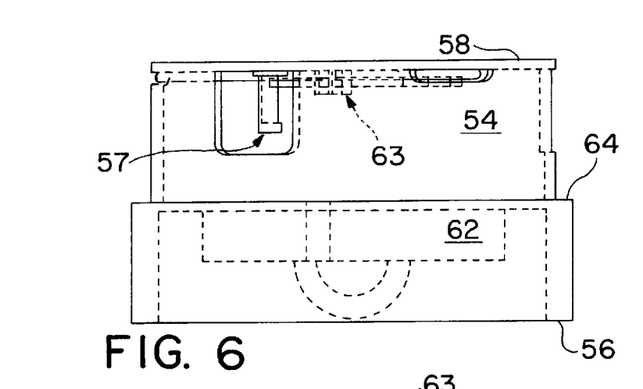
FIG. 6 is a side view, partly in phantom, of a cap with the times retracted.
Figure 7:
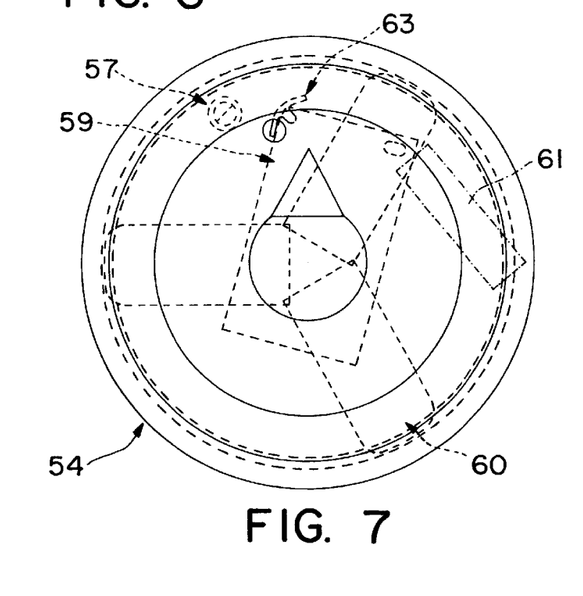
FIG. 7 is an end view, partly in phantom, of the actuation end of the cap of FIG. 6.
Figure 8:
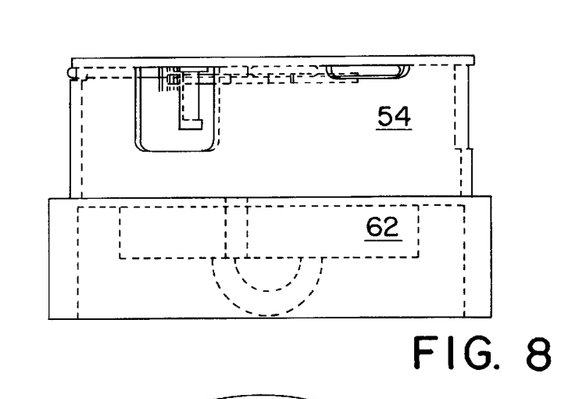
FIG. 8 is a side view, partly in phantom, of the cap of FIG. 6 with the times extended.
Figure 9:
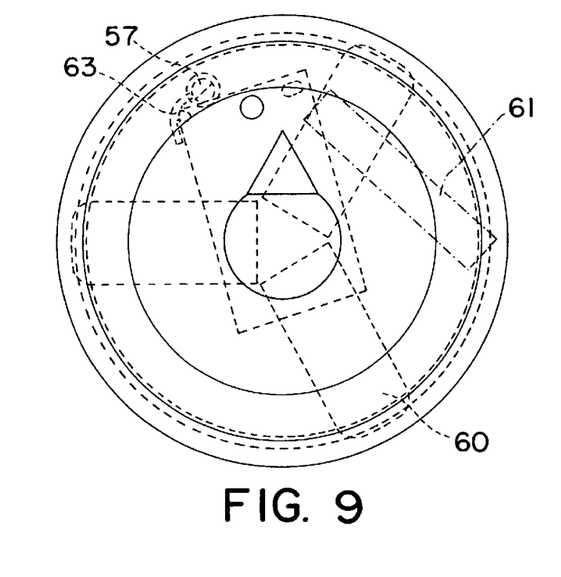
FIG. 9 is an end view, partly in phantom, of the actuation end of the cap of FIG. 8.

A generally cylindrical cap 54 is engageable substantially within the housing first end portion 14. When engaged, an actuation end 56 of the cap 54 faces outwardly of the housing first end portion 14 and a locking end 58 is located within the housing 12 between the shoulder 24 and housing second end 20. As shown in FIGS. 6 and 7, the cap actuation end 56 may include a shoulder 64 to limit insertion of the locking end 58 within the housing 12. The cap includes a plurality of pawls 60 which are selectively radially projectable (see FIG. 9) and retractable (see FIG. 7).

An actuation device 62 is mounted to the cap 54 and is accessible for manual manipulation from the actuation end 56. The actuation device 62 incorporates well known mechanisms such as timing or barometric pressure devices. The actuation device 62 is connected for rotation of a locking pin 57 having a hemispherical cross-sectional shape. Each pawl 60 is pivotally mounted to a locking plate 59. The locking plate 59 is mounted to the cap 54 for limited rotation between a free position shown in FIG. 7 and a lock position shown in FIG. 9. The locking plate 59 is biased toward the free position by a spring 61. A locking tab 63 is mounted to the locking plate 59 for limited pivotal movement against a bias.

Engagement of the locking tab 63 with the rounded portion of locking pin 57 functions to maintain the locking plate 59 in the lock position, thereby placing the pawls 61 in the projected position. At a predetermined time or height, the actuation device 62 rotates the locking pin 57 so that the flat portion aligns with the locking tab 63, freeing the locking tab 63 from engagement with the locking pin 57. Once freed, the locking plate 59 is biased into the free position, thereby placing the pawls 60 in the retracted position. A cap such as an aerial flare timer assembly available from M. H. Rhodes of Avon, Connecticut is suitable for use in the invention. In actuation devices using timing mechanisms, the timing delay is preferably longer than the normal seventy second delay used in aerial flares and more preferably two minutes. The pawls 60 may also be manually actuated to the projected or retracted positions in well known fashion.

A backing plate 66 with an aperture 68 is positionable within the housing 12 over the folded parachute canopy 46. A spring 72, when compressed, is also positionable within the housing 12. Preferably, the spring 72 is a coil spring defining an internal cavity 74. A lanyard or cord 78 connects the cap 54 to the parachute canopy 46 and preferably the lanyard is laced through the spring cavity 74 and backing plate aperture 68.

A free fall distribution device 10 is assembled by positioning the slings 40 within the housing 12 with the loop 42 toward the second end 20. The slings extend substantially longitudinally from the housing second end 20 along the interior housing wall into the sling passages 34 and extend radially therefrom. The parachute canopy 46 is folded so that it is nested within the housing 12, above the base plate 38 and between the slings 40. The free end 50 of the canopy 46 faces the housing first end 18. The backing plate 66 is placed over the canopy free end 50. The spring 72 is placed over the backing plate 66 and compressed by insertion of the cap locking end 58 within the housing first end portion 14. The cap actuation end 56 preferably fits substantially flush with the flange 30. The lanyard 78 is disposed within the housing 12, attached at opposing ends to the cap locking end 58 and parachute canopy 46, and preferably is laced through the spring cavity 74 and backing plate aperture 68. Manual manipulation of the actuation device 62 in well known manner moves the pawls 60 to the projected position, releasably fixing the components within the housing 12.

It should be noted that the slots 26, 32 allow the slings 40 to extend from the housing 12 while also allowing the cap 54 to be fixed to the housing 12 via cooperation of the pawls 60 and circumferential shoulder 24. Preferably, the cap 54 contains a number of pawls 60 which is not equal to or a multiple of the number of slots 26, so that the cap 54 can not be freed by rotation of the cap 54 so that the pawls 60 enter the slots 26. Alternatively, the housing slots 26 may not extend past the circumferential shoulder 24 so that the pawls 60 are incapable of traveling along the slots 26 and freeing the cap 54. In the alternative embodiment, clearance between the cap 54 and housing inner wall must be sufficient to allow the slings 40 to extend between the cap 54 and the housing inner wall. Less preferably, the pawls 60 may engage apertures (not shown) defined within the housing wall.

Figure 5:
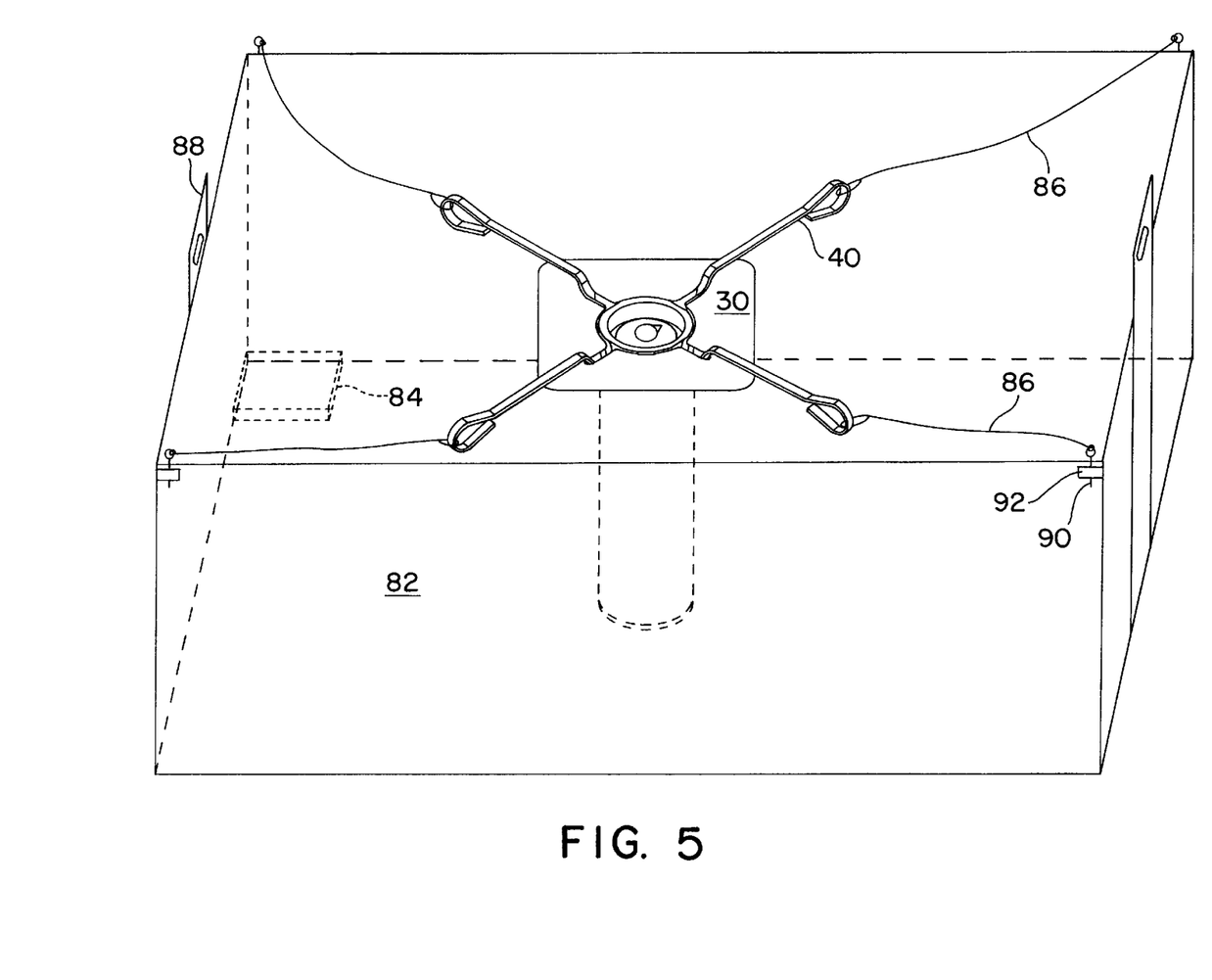
FIG. 5 is a perspective view, partly in phantom, of a free fall distribution device incorporated with a container.

In use, a container 82 (shown in FIG. 5) containing a plurality of material or individual supplies 84, such as, for instance, meal packets, is provided. Typically, the container would hold dozens to hundreds of individual supplies. The container 82 may have cords 86 incorporated within the container structure. When sufficient tension force is imposed on the cords 86, the structure of the container 82 is destroyed. Less preferably, the container 82 may be constructed of materials such as cardboard, wood, polymer or metal and temporarily held together by removable retaining devices, such as, for example, pins 90 within yokes 92. The pins 90 are attached to the cords 86. In a different alternative, the container 82 could be comprised of fabric or netting sections which are held together by cords 86. In any case, as used in this specification, a container 82 means any receptacle for holding material which includes cords 86 for releasing the material therein when sufficient tension force is imposed on the cords 86.

The assembled free fall distribution device 10 is placed partially within a container 82. This is readily accomplished by the insertion of the housing second end portion 16 within a preexisting circular hole slightly larger than the housing 12 exterior diameter. The flange 30 functions to prevent the free fall distribution device 10 from falling completely within the container 82. If necessary, the free fall distribution device 10 may be temporarily secured to the containers 82 by use of adhesive tape over the container and flange and/or radially extending slings (not shown). The container cords 86 are attached to the slings 40 by, for example, devises or shackles. The actuation device 62 is set for a predetermined time delay or actuation height. The container 82, with assembled free fall distribution device 10 is loaded into an aircraft. It should be noted that placement of the assembled free fall distribution device 10 substantially within the container 82 allows multiple containers to be stacked without interference from the incorporated free fall distribution device 10.

At a desired location and predetermined altitude, for example 35,000 feet, the container 82 is ejected from the aircraft and descends in free fall toward the ground. The actuation device 62 is activated upon ejection from the aircraft and is triggered at a predetermined height over the ground. While the trigger height is variable, 2,000 feet would be a typical trigger height. Triggering of the actuation device 62 retracts the pawls 60 allowing the compressed spring 72 to eject the cap 54 from the housing 12. Preferably, the extended length of the spring 72 is great enough so that a significant portion of the spring 72 is also ejected from the housing 12. Placement of the spring 72 between the backing plate 66 and the cap 54 is preferred. In this placement the spring 72 must only eject the cap 54 and therefore the spring 72 force required will be less than if the spring was placed between the base plate 38 and folded parachute canopy 46 and required to eject both the canopy 46 and cap 54. The use of a spring 72 with a lower spring force is also beneficial in that the force exerted by the spring 72 on the cap 54, and thereby through the pawls 60 to the shoulder 24 is minimized. The lower force allows the use of lighter actuation mechanisms and more positive retraction of the pawls 60. Momentum of the components 54, 72 and entry of the cap 54 and/or spring 72 into the slip stream of the falling container 82 imposes a force on those components which is transmitted via the lanyard 78 to the parachute canopy 46. The force pulls the parachute canopy 46 from the housing 12 into the slip stream, allowing the parachute canopy 46 to deploy. It should be noted that connection of the cap 54 and spring 72 by the lanyard 78 allows the components to diverge in the slipstream of the falling container, increasing the drag force available to pull the canopy 46 from the housing. The deploying parachute canopy 46 rapidly decelerates, imposing a substantial and sudden tension force through the canopy shrouds 48 to the slings 40 and thereby to the cords 86 and container 82. The tension force imposed by the deploying parachute canopy 46 onto the shrouds 48 and cords 86 functions to either rip apart or disassemble the container 82. Once the container 82 is destroyed and/or disassembled, the material enclosed within will free fall to the ground. The aerodynamic forces acting on the individual supplies will cause each of the containers to fall at a slightly different rate and therefore, have a slightly different final location on the ground. However, since the materials are released at a controlled height, for example, 2,000 feet, the spreading of materials during free fall is limited and therefore, their dispersion on the ground will be similarly limited in a controlled fashion.

While the preferred embodiment of the foregoing invention has been set forth for purposes of illustration, the foregoing description should not be deemed a limitation the invention herein. Accordingly, various modifications, adaptations and alternatives may occur to one skilled in the art without departing from the spirit and the scope of the present invention.

What is claimed is:

1. A device for imposing tension force during descent from a height comprising:

means for housing having a first end portion;

means for descent deceleration disposed within said housing means;

means for tension force transfer attached to said descent deceleration means, said tension force transfer means partially disposed within said housing means and partially extending from said housing means when said device is assembled;

a cap selectively engaged with said first end portion of said housing means, said cap including actuation means for selectively disengaging said cap from said housing means; and a spring disposed in said housing means and exerting separation force on said cap when said cap is engaged with said housing means.

2. The device of claim 1, wherein said housing means comprises a rigid cylinder.

3. The device of claim 1, wherein said housing means comprises a rigid cylinder having a radially inwardly extending segmented shoulder and said cap is selectively engaged with said shoulder.

4. The device of claim 1, wherein said housing means defines a slot longitudinally extending within said first end portion.

5. The device of claim 1, wherein said housing means defines a longitudinally extending slot, a flange mounted to said housing means defines a radially extending slot, and said housing means slot and said flange slot are radially aligned to define a single passage.

6. The device of claim 1, wherein said housing means comprises a rigid cylinder having an inner wall defining an undivided tubular cavity therein and said cap includes a cylindrical portion for engagement with said inner wall.

7. The device of claim 1, wherein a lanyard connects said cap to said descent deceleration means.

8. A device for imposing tension force during descent from a height comprising:

means for housing having a first end portion, defining a longitudinal axis and including a flange mounted substantially perpendicularly to said axis;

means for descent deceleration disposed within said housing means;

means for tension force transfer attached to said descent deceleration means, said tension force transfer means partially disposed within said housing means and partially extending from said housing means;

a cap selectively engaged with said first end portion of said housing means, said cap including actuation means for selectively disengaging said cap from said housing means; and a spring disposed in said housing means and exerting separation force on said cap when said cap is engaged with said housing means.

9. A device for opening a container during free descent of the container from a height comprising:

an elongated housing with first and second end portions and defining a cavity therein;

a parachute disposed within said cavity;

a cap selectively engaged to said housing;

an actuation device for selectively disengaging said cap from said housing;

a sling for connecting said device for opening and said container; and a spring compressed within said housing and exerting separation force on said cap when said cap is engaged with said housing.

10. The device of claim 9, wherein said housing is rigid, a flange is mounted to said first end portion and said second end portion is located within said container.

11. The device of claim 9, wherein said parachute includes a shroud line and said sling includes a first end attached to said shroud line within said housing and a second end extending external to said housing.

12. The device of claim 9, wherein said housing defines a slot extending longitudinally from a first end toward said second end portion and said sling extends through said slot.

13. The device of claim 9, wherein said housing is rigid and defines a slot extending longitudinally from a first end toward said second end portion, a flange is mounted to said first end portion and defines a radially extending slot, said housing slot and flange slot are radially aligned and interconnected to define a single passage and said sling extends through said passage.

14. The device of claim 9, wherein said housing is cylindrical and defines a first internal diameter adjacent a first end, said first end portion includes a radially inwardly projecting shoulder defining a second internal diameter less than said first internal diameter and said cap is a stepped cylinder with a first external diameter engageable with said first internal diameter and a second external diameter engageable with said second internal diameter.

15. The device of claim 14, wherein said cap includes a pawl radially projectable from said second external diameter.

16. The device of claim 9, wherein said parachute includes a shroud line and said sling includes a first end attached to said shroud line within said housing and a second end extending external to said housing, said parachute and said sling having no attachment to said housing.

17. An apparatus for use with a container closeable to confine a plurality of objects therein and openable upon the imposition of tension force to a release point to thereby release said plurality of objects comprising:

a housing with first and second end portions having respective first and second ends and defining a cavity therein;

a parachute having a plurality of shroud lines, both disposed within said cavity;

a cap selectively engaged to said housing, said cap attached to said parachute by a cord;

an actuation device for selectively disengaging said cap from said housing;

a sling with a first end attached to said shroud lines within said housing and a second end extending external to said housing; and a spring compressed within said housing and exerting separation force on said cap when said cap is engaged with said housing;

said sling cooperating with said parachute to impose tension force on said release point when said apparatus is descending and said actuation device disengages said cap from said housing.

18. A method of distributing a plurality of separable objects held within a container, said container selectively openable upon the imposition of tension force to a release point to release said objects comprising:

allowing said container to descend in free fall from a first height;

deploying a parachute at a second lesser height;

generating tension force from said parachute deployment;

utilizing said tension force to open said container; and allowing said objects to separate and individually free fall to said surface thereby dispersing said objects over a controlled area.

19. The method of claim 18 including the steps of providing a device for opening said container at said second height comprising a housing with first and second end portions and defining a cavity therein, a parachute disposed within said cavity, a cap selectively engaged to said housing, an actuation device for selectively disengaging said cap from said housing, a sling with a first end attached to said parachute within said housing and a second end extending external to said housing, and a spring compressed within said housing and exerting separation force on said cap; and attaching said sling second end to said release point.

20. The method of claim 19, including the step of positioning said device partially within said container.

* * * * *